(12) United States Patent
Wakai (10) Patent No.: US 8,422,020 B2
(45) Date of Patent: Apr. 16, 2013

(54) VARIABLE SPECTRAL ELEMENT

(75) Inventor: Hiroshi Wakai, Hamura (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/617,939

(22) Filed: Sep. 14, 2012

(65) Prior Publication Data

US 2013/0010285 A1    Jan. 10, 2013

Related U.S. Application Data

(63) Continuation of application No. PCT/JP2011/055996, filed on Mar. 15, 2011.

(30) Foreign Application Priority Data

Mar. 30, 2010 (JP) .................................. 2010-078214

(51) Int. Cl.
*G01B 9/02* (2006.01)
*G01J 3/45* (2006.01)
*G02B 27/00* (2006.01)

(52) U.S. Cl.
USPC .......................................... 356/454; 359/578

(58) Field of Classification Search .................. 356/454, 356/519; 359/578, 579
See application file for complete search history.

(56) References Cited

U.S. PATENT DOCUMENTS

| 7,190,523 | B2 * | 3/2007 | Yoda ............................... | 359/579 |
| 8,081,314 | B2 * | 12/2011 | Kamihara ........................ | 356/454 |
| 8,319,169 | B2 * | 11/2012 | Funasaka ........................ | 250/216 |
| 2010/0027010 | A1 | 2/2010 | Matsumoto | |
| 2010/0103522 | A1 | 4/2010 | Matsumoto | |
| 2013/0016359 | A1 * | 1/2013 | Wakai ............................ | 356/454 |

FOREIGN PATENT DOCUMENTS

| EP | 2 083 307 A1 | 7/2009 |
| EP | 2 120 082 A1 | 11/2009 |
| JP | 06-241899 | 9/1994 |
| JP | 2008-129149 | 6/2008 |
| JP | 2008-197362 | 8/2008 |
| JP | 2010-224011 | 10/2010 |
| WO | 2008/059892 A1 | 5/2008 |
| WO | 2008/099817 A1 | 8/2008 |
| WO | 2011/122324 A1 | 10/2011 |

* cited by examiner

*Primary Examiner* — Michael A Lyons
(74) *Attorney, Agent, or Firm* — Scully Scott Murphy & Presser, PC (57) ABSTRACT

The variable spectroscopic element includes a pair of optical substrates $2_1$-$2_2$, four sensors $3_1$-$3_4$, four piezoelectric elements $4_1$-$4_4$, and a control section. The sensors $3_1$, $3_3$ are arranged to form symmetry with respect to the center axis, which links gravity centers of mutually facing surfaces of the optical substrates $2_1$-$2_2$, and so are the sensors $3_2$, $3_4$. The control section calculates, from signals of the sensors $3_1$-$3_4$, a distance x between the gravity centers of the mutually facing surfaces, and angles $\theta$, $\phi$ each of which is formed by a plane perpendicular to the center axis and the facing surface of the movable substrate $2_2$, to drive the piezoelectric elements $4_1$-$4_4$ on the basis of the distance x, the angles $\theta$, $\phi$, and to carry out feedback control and feed forward control with respect to at least one of the distance x, the angle $\theta$, and the angle $\phi$.

4 Claims, 8 Drawing Sheets

VARIABLE SPECTRAL ELEMENT

This application claims benefits of Japanese Application No. 2010-078214 filed in Japan on Mar. 30, 2010, the contents of which are incorporated herein by reference.

BACKGROUND OF THE INVENTION

1) Field of the Invention

The present invention relates to a variable spectroscopic element.

2) Description of Related Art

There has been known a variable spectroscopic element provided with an etalon device and a control section (See JP KOKAI No. 2008-1291, for example), in which a pair of optical substrates are arranged to face each other with a spacing between and at least one of the optical substrates is made movable by use of actuators such as piezoelectric elements, so that the optical property is changeable by change of intersurface distance between the optical substrates or between reflecting films formed on the optical substrates (hereafter, generally referred to as "intersurface distance between optical substrates").

Of such a variable spectroscopic element, there has been known a type (for example, JP KOKAI No. Hei 6-241899) in which, for the purpose of setting the intersurface distance between optical substrates to have a desired value, capacitive sensors for measuring the intersurface distance are arranged on the mutually facing surfaces to measure the instant intersurface distance at a predetermined sampling interval, comparison is made between the intersurface distance as measured and a desired intersurface distance, and the intersurface distance is adjusted by actuating actuators based on the comparison result.

SUMMARY OF THE INVENTION

A variable spectroscopic element according to the present invention includes a pair of optical substrates arranged to face each other with a space between, first to fourth capacitive sensors each of which has a pair of electrodes arranged on mutually facing surfaces of the pair of optical substrates for detecting an intersurface distance between the mutually facing surfaces of the pair of optical substrates at each position where the pair of electrodes are arranged, and first to fourth actuators that move at least one of the pair of optical substrates relative to the other optical substrate for changing intersurface distances between the mutually facing surfaces of the pair of optical substrates, wherein the first capacitive sensor and the third capacitive sensor are arranged at positions that form symmetry with respect to an axis determined by a line that links respective gravity centers of the mutually facing surfaces of the pair of optical substrates; the second capacitive sensor and the fourth capacitive sensor are arranged at positions that form symmetry with respect to the axis determined by the line that links the respective gravity centers of the mutually facing surfaces of the pair of optical substrates; the first to fourth actuators are arranged, respectively, on lines that extend from the gravity centers of the mutually facing surfaces of the pair of optical substrates toward respective centers of the first to fourth capacitive sensors; and the variable spectroscopic element is provided with a control section that calculates, from signals by the first to fourth capacitive sensors, a distance between the respective gravity centers of the mutually facing surfaces of the pair of optical substrates, calculates, from a signal by the first capacitive sensor and a signal by the third capacitive sensor, a first angle formed by a plane perpendicular to the line that links the respective gravity centers and one of the mutually facing surfaces of moving one of the optical substrates, calculates, from a signal by the second capacitive sensor and a signal by the fourth capacitive sensor, a second angle formed by a plane perpendicular to the line that links the respective gravity centers and the one of the mutually facing surface of the moving one of the optical substrates, drives the first actuator and the third actuator on the basis of the distance between the gravity centers and the first angle, drives the second actuator and the fourth actuator on the basis of the distance between the gravity centers and the second angle, carries out a feedback control with respect to the distance between the gravity centers, the first angle and the second angle, and carries out a feed forward control with respect to at least one of the distance between the gravity centers, the first angle and the second angle.

A variable spectroscopic element of the present invention includes a pair of optical substrates arranged to face each other with a space between, first to fourth capacitive sensors each of which has a pair of electrodes arranged on mutually facing surfaces of the pair of optical substrates for detecting an intersurface distance between the mutually facing surfaces of the pair of optical substrates at each position where the pair of electrodes are arranged, and first to fourth actuators that move at least one of the pair of optical substrates relative to the other optical substrate for changing intersurface distances between the mutually facing surfaces of the pair of optical substrates, wherein the first capacitive sensor and the third capacitive sensor are arranged at positions that form symmetry with respect to an axis determined by a line that links respective gravity centers of the mutually facing surfaces of the pair of optical substrates; the second capacitive sensor and the fourth capacitive sensor are arranged at positions that form symmetry with respect to the axis determined by the line that links the respective gravity centers of the mutually facing surfaces of the pair of optical substrates; the first to fourth capacitive sensors and the first to fourth actuators are alternately arranged at equiangular intervals with respect to the axis determined by the line that links respective gravity centers of the mutually facing surfaces of the pair of optical substrates, as viewed from the direction along the axis; and the variable spectroscopic element is provided with a control section that calculates, from signals by the first to fourth capacitive sensors, a distance between the respective gravity centers of the mutually facing surfaces of the pair of optical substrates, calculates, using values of intersurface distances between the mutually facing surfaces of the pair of optical substrates at positions where the first and third actuators are arranged, which are acquired from signals by the first to fourth capacitive sensors, a first angle formed by a plane perpendicular to the line that links the respective gravity centers and one of the mutually facing surfaces of moving one of the optical substrates, calculates, using values of interface distances between the mutually facing surfaces of the pair of optical substrates at positions where the second and fourth actuators are arranged, which are acquired from signals by the first to fourth capacitive sensors, a second angle formed by a plane perpendicular to the line that links the respective gravity centers and the one of the mutually facing surface of the moving one of the optical substrates, drives the first to fourth actuators on the basis of the distance between the gravity centers, the first angle and the second angle, carries out a feedback control with respect to the distance between the gravity centers, the first angle and the second angle, and carries out a feed forward control with respect to at least one of the distance between the gravity centers, the first angle and the second angle.

These and other features and advantages of the present invention will become apparent from the following detailed description of the preferred embodiments when taken in conjunction with the accompanying drawings.

BRIEF DESCRIPTION OF THE DRAWINGS

FIG. 6 are graphs that show response characteristics of the etalon device shown in FIG. 1, where

FIG. 7 are graphs that show response characteristics of the etalon device shown in FIG. 1, where

DETAILED DESCRIPTION OF THE PREFERRED EMBODIMENTS

The embodiments of the present invention will be explained in detail below in reference to the drawings.

Embodiment 1

The first embodiment of the variable spectroscopic element according to the present invention will be explained in reference to FIG. 1 to FIG. 7, and then four modification examples will be explained in reference to FIG. 8 to FIG. 11.

Figure 1:
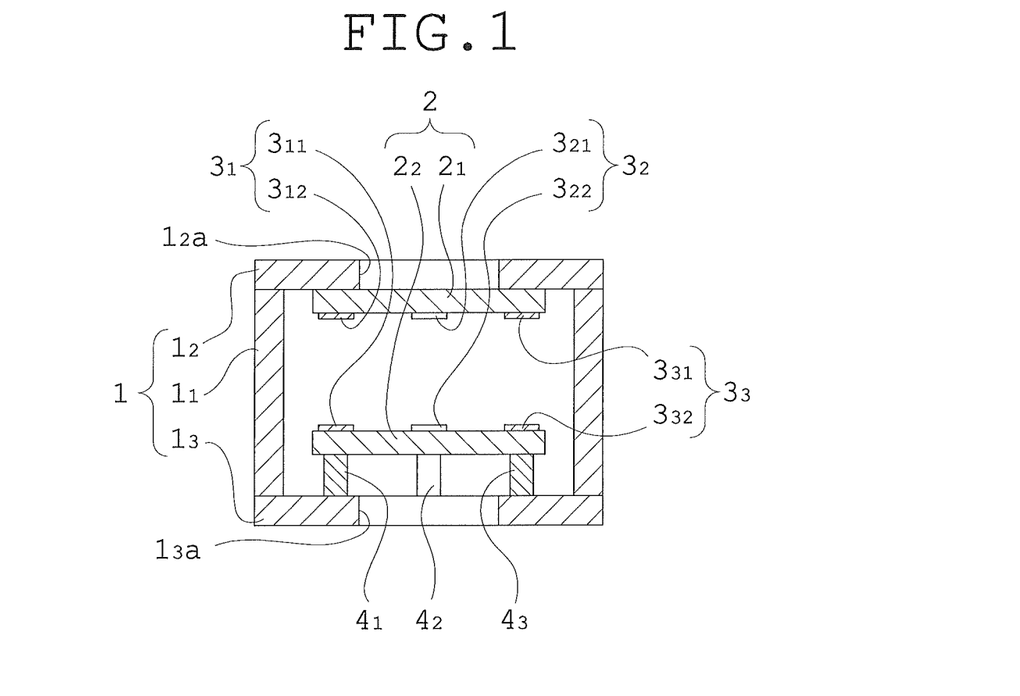
FIG. 1 is a sectional view that shows an etalon device of a variable spectroscopic element according to Embodiment 1.
Figure 2:
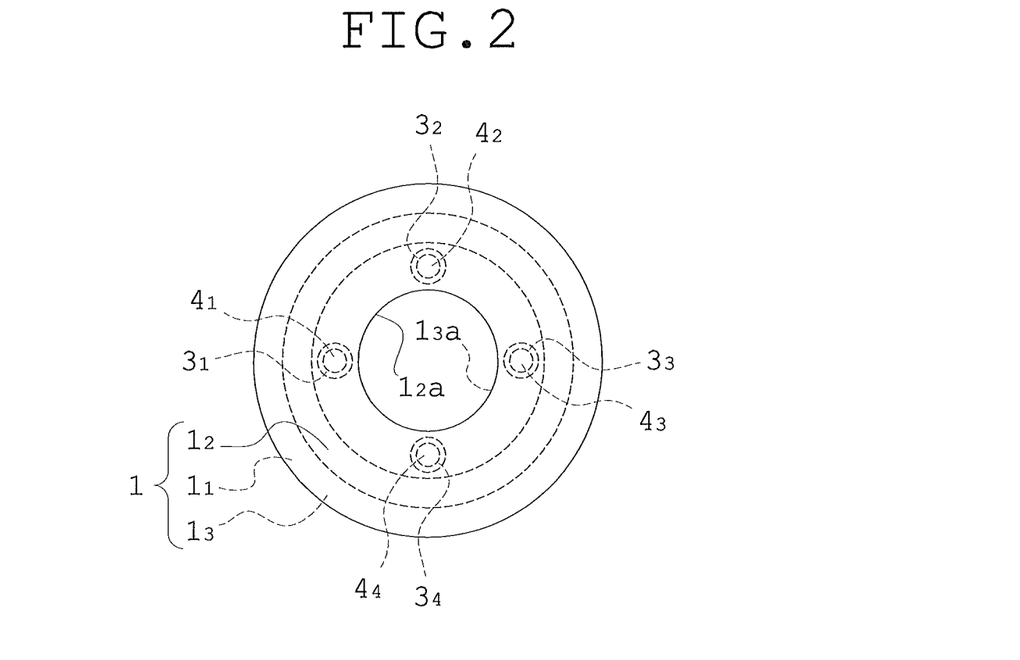
FIG. 2 is a plan view of the etalon device of FIG. 1.
Figure 3:
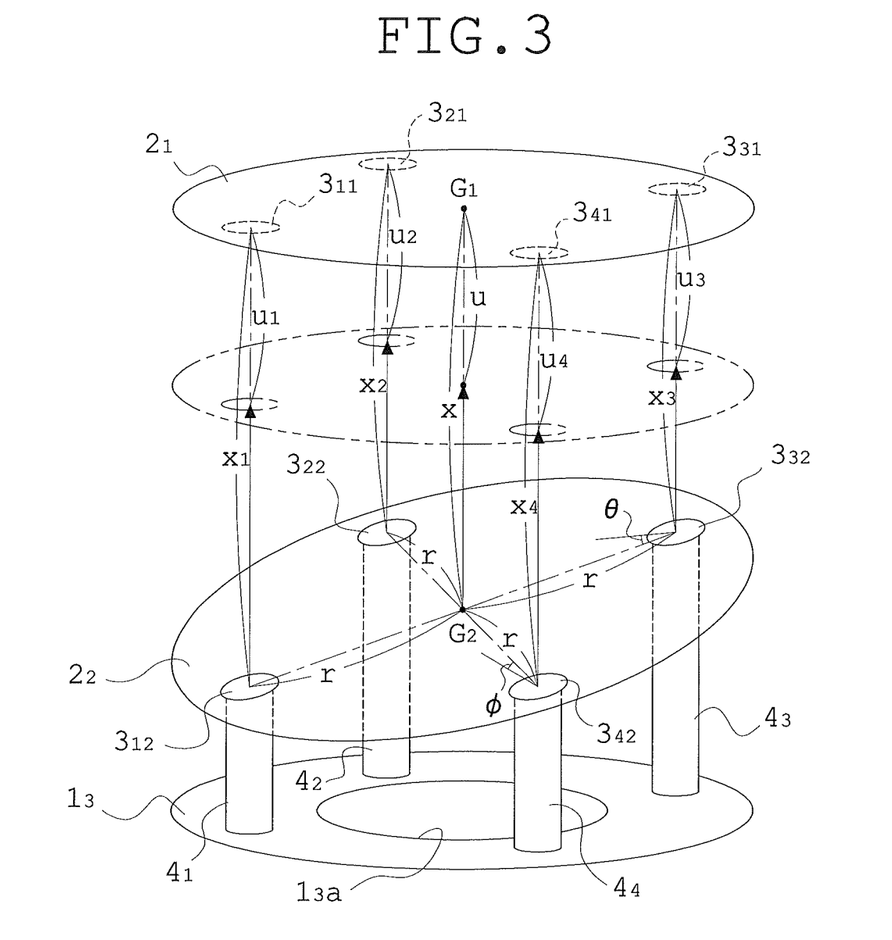
FIG. 3 is a schematic diagram that shows behavior of a pair of optical substrates and four piezoelectric elements of the etalon device of FIG. 1.
Figure 4:
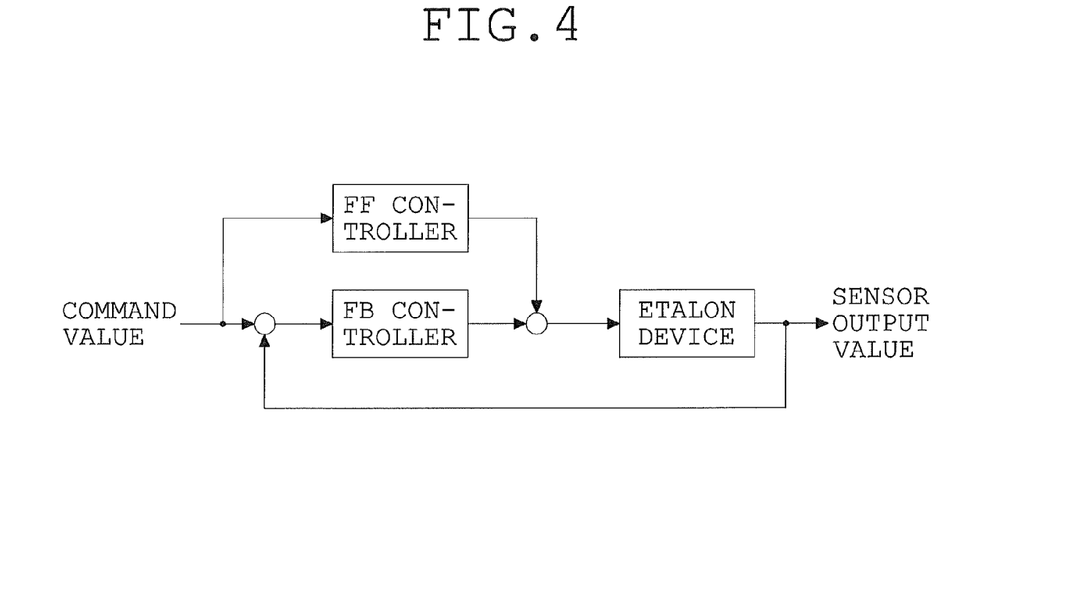
FIG. 4 is a block diagram that shows a control circuit of the variable spectroscopic element according to Embodiment 1.
Figure 5:
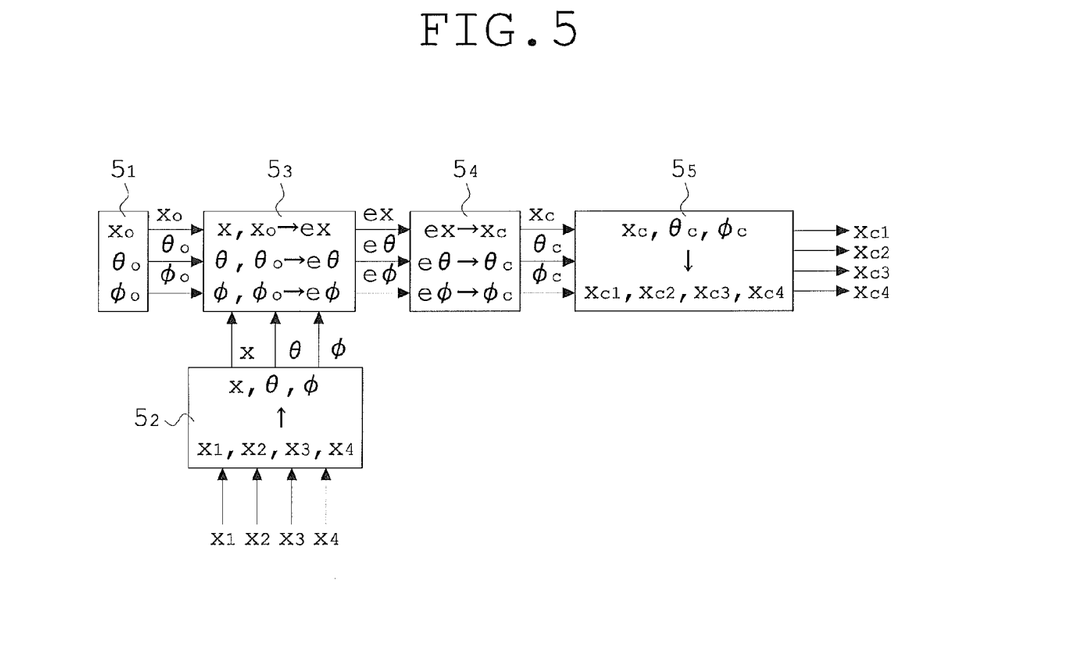
FIG. 5 is a block diagram that shows calculations executed by a control section of the variable spectroscopic element according to Embodiment 1.
Figure 6A:
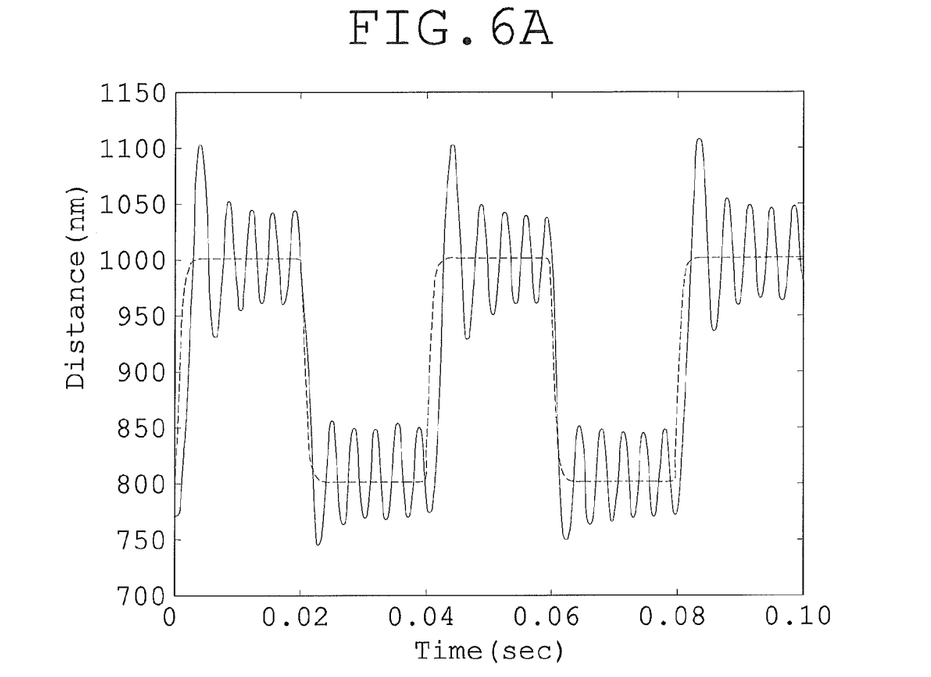
FIG. 6A is a graph of the case where control is implemented by a conventional variable spectroscopic element.
Figure 6B:
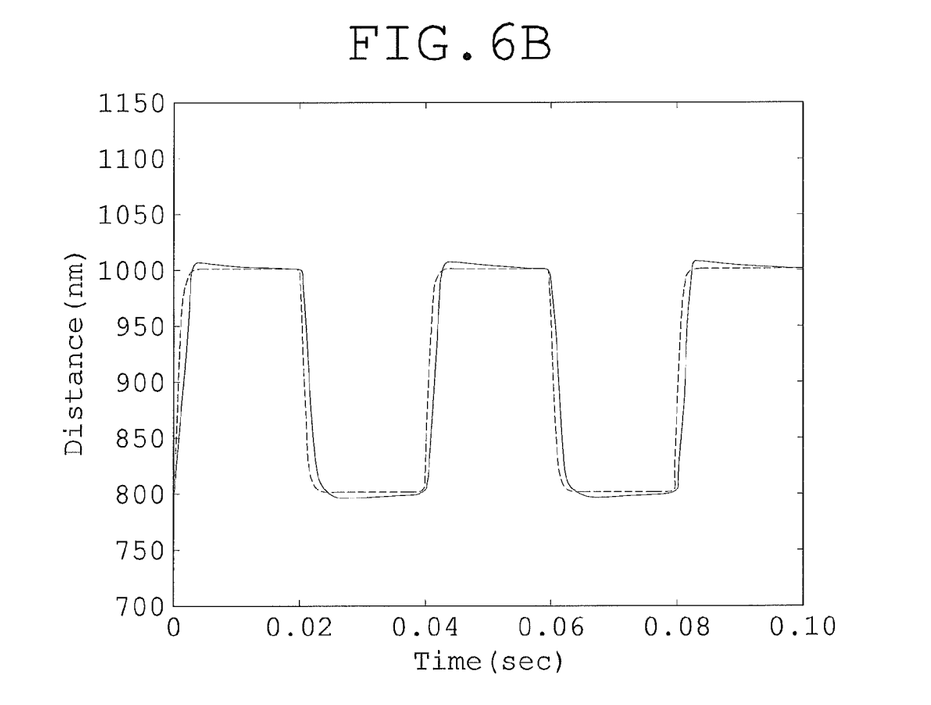
FIG. 6B is a graph of the case where control is implemented by the variable spectroscopic element of Embodiment 1.
Figure 7A:
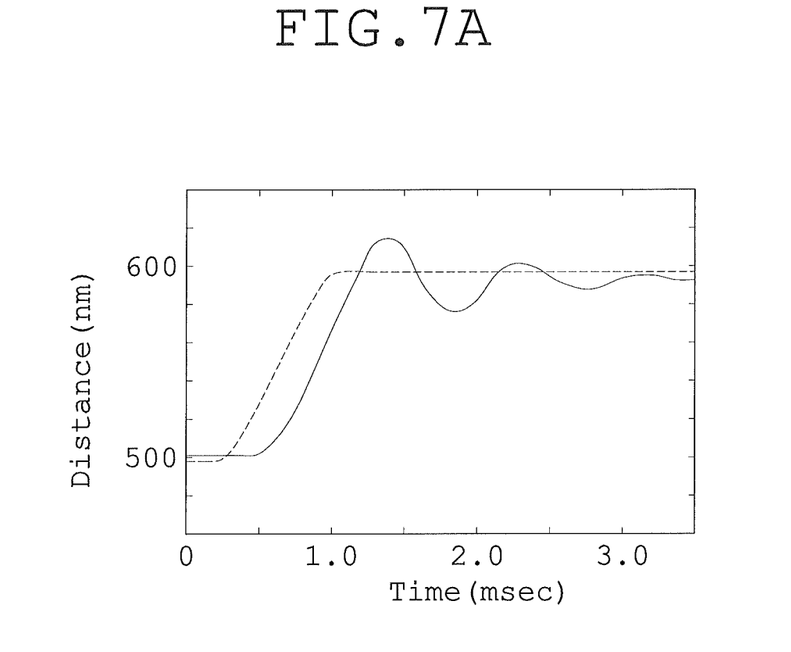
FIG. 7A is a graph of the case where only feedback control is implemented.
Figure 7B:
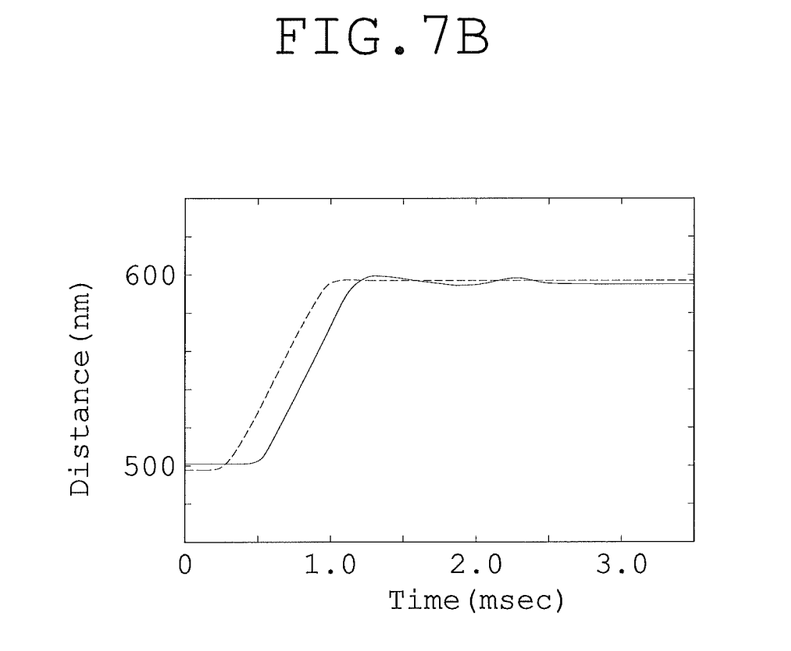
FIG. 7B is a graph of the case where feedback control and feed forward control are implemented.
Figure 8:
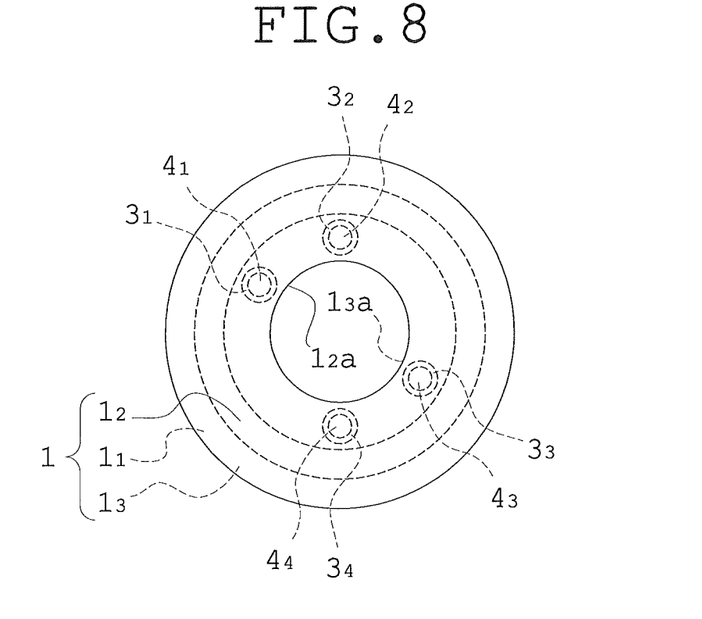
FIG. 8 is a plan view that shows a first modification example of the etalon device of FIG. 1.
Figure 9:
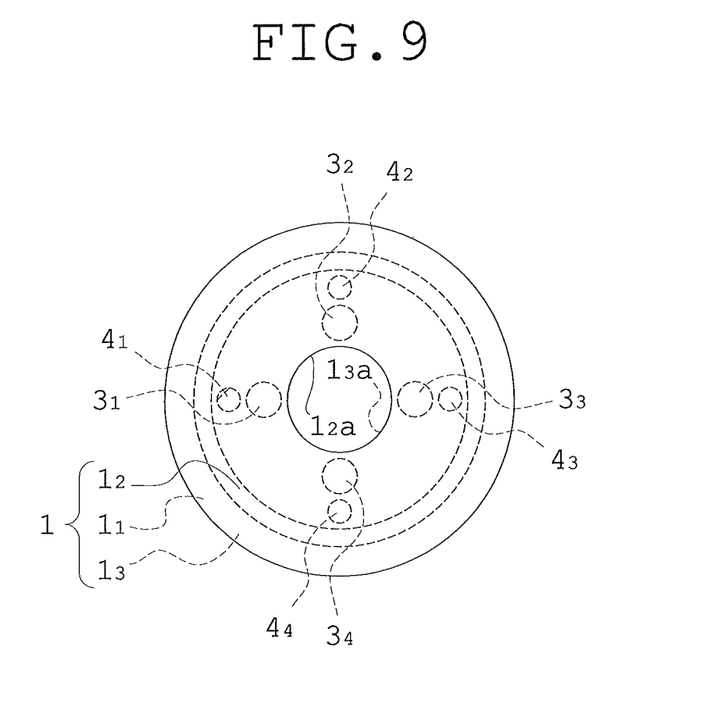
FIG. 9 is a plan view that shows a second modification example of the etalon device of FIG. 1.
Figure 10:
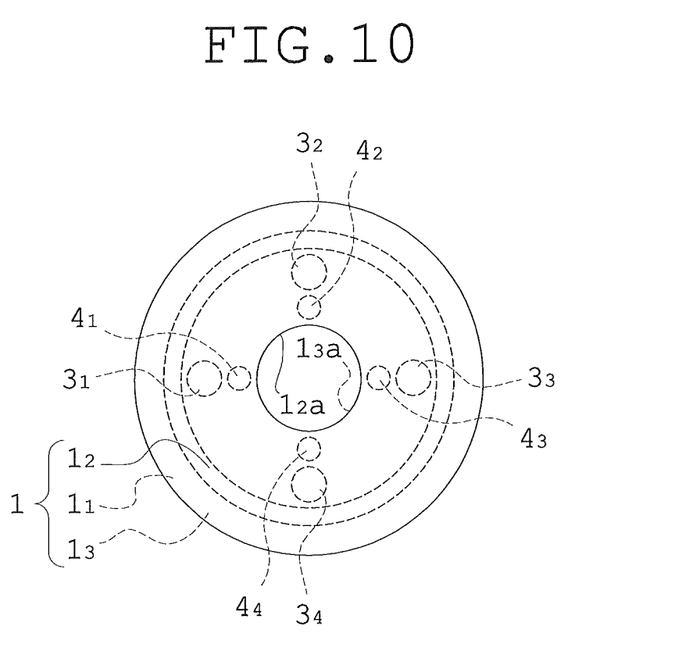
FIG. 10 is a plan view that shows a third modification example of the etalon device of FIG. 1.
Figure 11:
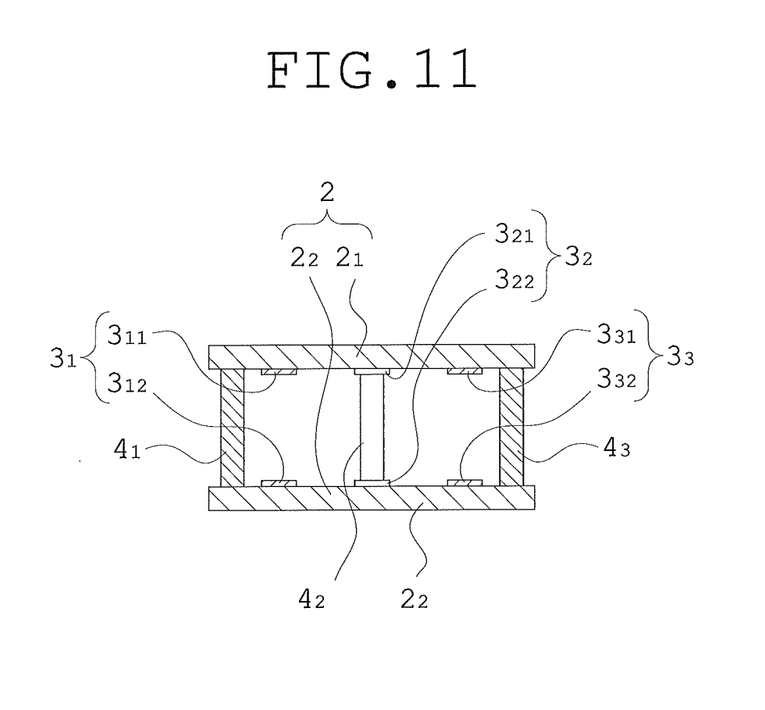
FIG. 11 is a sectional view that shows a fourth modification example of the etalon device of FIG. 1.

FIG. 1 is a sectional view that shows an etalon device of a variable spectroscopic element according to this embodiment. FIG. 2 is a plan view of the etalon device of FIG. 1. FIG. 3 is a schematic diagram that shows behavior of a pair of optical substrates and four piezoelectric elements of the etalon device of FIG. 1. FIG. 4 is a block diagram that shows a control circuit of the variable spectroscopic element according to this embodiment. FIG. 5 is a block diagram that shows calculations executed by a control section of the variable spectroscopic element according to this embodiment. FIG. 6 are graphs that show response characteristics of the etalon device shown in FIG. 1, where FIG. 6A is a graph of the case where control is implemented by a conventional variable spectroscopic element, and FIG. 6B is a graph of the case where control is implemented by the variable spectroscopic element of this embodiment. FIG. 7 are graphs that show response characteristics of the etalon device shown in FIG. 1, where FIG. 7A is a graph of the case where only feedback control is implemented, and FIG. 7B is a graph of the case where feedback control and feed forward control are implemented. FIG. 8 is a plan view that shows a first modification example of the etalon device of FIG. 1. FIG. 9 is a plan view that shows a second modification example of the etalon device of FIG. 1. FIG. 10 is a plan view that shows a third modification example of the etalon device of FIG. 1. FIG. 11 is a sectional view that shows a fourth modification example of the etalon device of FIG. 1.

The variable spectroscopic element according to the present invention is constructed of an etalon device shown in FIG. 1 and FIG. 2 and a control section not shown.

First, in reference to FIG. 1 and FIG. 2, an explanation will be made on the etalon device of this variable spectroscopic element.

As shown in FIG. 1 and FIG. 2, this etalon device is provided with, inside an outer frame 1, a pair of optical substrates 2, capacitive sensors, which are means for measuring intersurface distances between two mutually facing surfaces of the pair of optical substrates 2, and piezoelectric elements, which are actuators for moving one of the pair of optical substrates 2 under a control by a control section not shown.

The outer frame 1 is constructed of a cylindrical member $1_1$ with an annular member $1_2$ mounted on one end face thereof and an annular member $1_3$ mounted on the other end face thereof.

The annular members $1_1$, $1_2$ have circular aperture sections $1_2a$, $1_3a$, respectively, formed substantially at the center thereof. In the etalon device, light passes through the aperture sections $1_2a$, $1_3a$.

The pair of optical substrates 2 are constructed of a fixed substrate $2_1$ and a movable substrate $2_2$ arranged in such a manner that their mutually facing surfaces are parallel to each other with a spacing between. Of these substrates, the fixed substrate $2_1$ is a disk-shaped optical member that is fixed to the annular member $1_2$ of the outer frame 1 in such a manner as to traverse, inside the outer frame 1, an axis of light passing through the aperture sections $1_2a$ and $1_3a$. On the other hand, the movable substrate $2_2$ is a disk-shaped optical member that is held by the piezoelectric elements in such a manner as to traverse light passing through the aperture sections $1_2a$, $1_3a$.

The pair of optical substrates 2 thus configured are made changeable in intersurface distance between the mutually facing surfaces as moved by the piezoelectric elements in a direction along the axis of light passing through the aperture sections $1_2a$ and $1_3a$, or a direction along a line that links respective gravity centers of the mutually facing surfaces of the pair of optical substrates.

A first capacitive sensor $3_1$, a second capacitive sensor $3_2$, a third capacitive sensor $3_3$, and a fourth capacitive sensor $4_3$ are formed of respective pairs of electrodes $3_{12}$ and $3_{12}$, $3_{21}$ and $3_{22}$, $3_{31}$ and $3_{32}$, and $3_{41}$ and $3_{42}$. Each pair of these pairs of electrodes are arranged to face each other on the mutually facing surfaces of the pair of optical substrates 2 at positions where they do not intercept light passing through the aperture sections $1_2a$ and $1_3b$ of the outer frame 1.

In these capacitive sensors, the principle that capacitance between electrodes is inversely proportional to intersurface distance is used. In this etalon device, values acquired from these capacitive sensors are converted into intersurface distances of the optical substrates 2, to be outputted to the control section not shown.

A first piezoelectric element $4_1$, a second piezoelectric element $4_2$, a third piezoelectric element $4_3$, and a fourth piezoelectric element $4_4$ are fixed to the annular member $1_3$ of the outer frame 1 in such a manner as not to intercept light passing through the apertures $1_2$a and $1_3$a inside the outer frame 1.

The first piezoelectric element $4_1$, the second piezoelectric element $4_2$, the third piezoelectric element $4_3$, and the fourth piezoelectric element $4_4$ are arranged, as viewed from the direction along the line that links the respective gravity centers of the mutually facing surfaces of the pair of optical substrates 2, at positions overlapping with the first capacitive sensor $3_1$, the second capacitive sensor $3_2$, the third capacitive sensor $3_3$, and the fourth capacitive sensor $3_4$, respectively.

The combination of the first capacitive sensor $3_1$ and the first piezoelectric element $4_1$ and the combination of the third capacitive sensor $3_3$ and the third piezoelectric element $4_3$ are arranged, as viewed from the direction along the line that links the respective gravity centers of the mutually facing surfaces of the pair of optical substrates 2, at positions that form symmetry with respect to an axis determined by the line linking the respective gravity centers.

On the other hand, the combination of the second capacitive sensor $3_2$ and the second piezoelectric element $4_2$ and the combination of the fourth capacitive sensor $3_4$ and the fourth piezoelectric element $4_4$ are arranged, as viewed from the direction of the line that links the respective gravity centers of the mutually facing surfaces of the pair of optical substrates 2, at positions that form symmetry with respect to the axis determined by the line linking the respective gravity centers.

The combination of the first capacitive censor $3_1$ and the first piezoelectric element $4_1$, the combination of the second capacitive sensor $3_2$ and the second piezoelectric element $4_2$, the combination of the third capacitive sensor $3_3$ and the third piezoelectric element $4_3$, and the combination of the fourth capacitive sensor $3_4$ and the fourth piezoelectric element $4_4$ are arranged at regular intervals as viewed from the direction along the line that links the respective gravity centers of the mutually facing surfaces of the pair of optical substrates 2.

Next, in reference to FIG. 3, an explanation will be made on the behavior and its control of the movable substrate $2_2$ in the etalon device of the variable spectroscopic element according to this embodiment.

As shown in FIG. 3, in the situation where the intersurface distance between the pair of optical substrates is to be set to $x_0$ by a movement of the movable substrate $2_2$ in reference to the fixed substrate $2_1$, according to a conventional etalon device, the first piezoelectric element $4_1$ would be driven so that the intersurface distance at the position where the first capacitive sensor $3_1$ is arranged comes to be the goal value $x_0$ on the basis of an output value of the first capacitive sensor $3_1$, and, in the similar manner, the second piezoelectric element $4_2$ would be driven on the basis of an output value of the second capacitive sensor $3_2$, the third piezoelectric element $4_3$ would be driven on the basis of an output value of the third capacitive sensor $3_3$, and the fourth piezoelectric element $4_4$ would be driven on the basis of an output value of the fourth capacitive sensor $3_4$.

However, under such a control, even if the first piezoelectric element $4_1$ is accurately driven and the intersurface distance between the pair of optical substrates 2 comes to be the goal value $x_0$ at the position where the first capacitive sensor $3_1$ is arranged, the intersurface distance may be changed from the goal value by a disturbance caused as the second or fourth piezoelectric element $4_2$ or $4_4$, which is arranged adjacent to the first piezoelectric element $4_1$, is driven.

As a measure to obviate this behavior, there is a method in which feedback control such as PID control (Proportional Integral Derivative Control) is adopted. In this case, it takes a long time for the intersurface distance between the optical substrates to come to the goal value $x_0$.

As an alternative measure, there is a method in which each piezoelectric element is given, as a command value, a preliminarily calculated-out value of disturbance caused by the remaining piezoelectric elements. However, since the calculation of the command value is very complicate, it also takes a long time for the intersurface distance between the optical substrates 2 to come to the goal value $x_0$.

Therefore, in the variable spectroscopic element according to the present invention, computation is carried out upon four output values of the first to fourth capacitive sensors $3_1$, $3_2$, $3_3$, $3_4$ being converted into three parameters, to control activity of the first to fourth piezoelectric elements $4_1$, $4_2$, $4_3$, $4_4$.

Next, in reference to FIG. 3 to FIG. 5, an explanation will be made in detail on arithmetic operations carried out by the control section of the variable spectroscopic element of this embodiment.

In the control section of the variable spectroscopic element of this embodiment, as shown in FIG. 4, a combination of feedback control and feed forward control is carried out. In the feedback control, an output value is determined on the basis of a command value and a sensor-output value, while, in the feed forward control, an output value is determined only on the basis of the command value. This is because incorporation of the feed forward control in addition to the feedback control can further reduce a time taken for the intersurface interval between the optical substrates to converge than the case where only the feedback control is adopted.

First, an explanation will be made in detail on the feedback control carried out at the control section of the variable spectroscopic element of this embodiment.

In the variable spectroscopic element of this embodiment, as shown in FIG. 3, in the situation where the intersurface distance between the pair of optical substrates 2 is to be set to $x_0$ by a movement of the movable substrate $2_2$ in reference to the fixed substrate $2_1$, first, as shown in FIG. 5, the goal value $x_0$ of a distance between a gravity center $G_1$ of a facing surface of the fixed substrate $2_1$ and a gravity center $G_2$ of a facing surface of the movable substrate $2_2$, a goal value $\theta_0$ of a first angle, and a goal value $\phi_0$ of a second angle, which angles are formed by a plane perpendicular to a line that links these gravity centers with the facing surface of the movable substrate $2_2$, are input to the control section via a goal-value input section $5_1$.

Then, a sensor-output converting section $5_2$ acquires intersurface distances $x_1$, $x_2$, $x_3$, $x_4$ measured by the first to fourth capacitive sensors $3_1$, $3_2$, $3_3$, $3_4$ at positions where the respective capacitive sensors are arranged, and converts the intersurface distances $x_1$, $x_2$, $x_3$, $x_4$ into an instant value x of the distance between the gravity center $G_1$ and the gravity center $G_2$, an instant value $\theta$ of the first angle, and an instant value $\phi$ of the second angle.

To be specific, the distance x between the respective gravity centers of the mutually facing surfaces of the pair of optical substrates 2 is given by the following equation:

$$x=(x_1+x_2+x_3+x_4)/4$$

Regarding the first angle $\theta$ and the second angle $\phi$ formed by a plane perpendicular to the line that links the gravity centers of the mutually facing surfaces of the pair of optical substrates 2 with the facing surface, which faces the fixed substrate $2_1$, of the movable substrate $2_2$, they can be expressed in terms of distances $r_{31}$, $r_{32}$, $r_{33}$, $r_{34}$, as known values, from the gravity center $G_2$ of the facing surface of the movable substrate $2_2$ to respective centers of the electrodes $3_{12}$, $3_{22}$, $3_{32}$, $3_{42}$, on the facing surface of the movable substrate $2_2$, of the first to fourth capacitive sensors $3_1$, $3_2$, $3_3$, $3_4$, as shown below:

$$\sin\theta = (x_3-x_1)/(r_{31}+r_{33})$$

$$\sin\phi = (x_4-x_2)/(r_{32}+r_{34})$$

In this embodiment, since the following condition is satisfied:

$$r_{31}=r_{32}=r_{33}=r_{34}=r$$

and the first angle $\theta$ and the second angle $\phi$ are sufficiently small, the first angle $\theta$ and the second angle $\phi$ are given by the following equations:

$$\theta = (x_3-x_1)/2r$$

$$\phi = (x_4-x_2)/2r$$

After that, respective differences between the goal values $x_0$, $\theta_0$, $\phi_0$ inputted via the goal-value input section $5_1$ and values x, $\theta$, $\phi$ as a result of conversion at the sensor-output converting section $5_2$ are calculated at a difference-value calculating section $5_3$.

After that, PID control is carried out at a command-value calculating section $5_4$, on the basis of the difference values ex, e$\theta$, e$\phi$ calculated at the difference-value calculating section $5_3$, to yield command values $x_c$, $\theta_c$, $\phi_c$.

After that, the command values $x_c$, $\theta_c$, $\phi_c$ generated at the command-value calculating section $5_4$ are converted into command values $x_{c1}$, $x_{c2}$, $x_{c3}$, $x_{c4}$ for the respective first to fourth piezoelectric elements $4_1$, $4_2$, $4_3$, $4_4$. The command values $x_{c1}$, $x_{c2}$, $x_{c3}$, $x_{c4}$ are inputted to a piezoelectric-element driver (not shown in the figure) for driving the first to fourth piezoelectric elements $4_1$, $4_2$, $4_3$, $4_4$, so that driving voltages are applied to the first to fourth piezoelectric elements $4_1$, $4_2$, $4_3$, $4_4$, respectively, by the piezoelectric-element driver.

Regarding the command values $x_{c1}$, $x_{c2}$, $x_{c3}$, $x_{c4}$ for the respective first to fourth piezoelectric elements $4_1$, $4_2$, $4_3$, $4_4$, they can be expressed in terms of distances $r_{41}$, $r_{42}$, $r_{43}$, $r_{44}$, as known values, from the gravity center $G_2$ of the facing surface of the movable substrate $2_2$ to respective centers of the first to fourth piezoelectric elements $4_1$, $4_2$, $4_3$, $4_4$, on the facing surface of the movable substrate $2_2$, as shown below:

$$x_{c1}=x_c-r_{41}\sin\theta_c$$

$$x_{c2}=x_c-r_{42}\sin\phi_c$$

$$x_{c3}=x_c+r_{43}\sin\theta_c$$

$$x_{c4}=x_c+r_{44}\sin\phi_c$$

In this embodiment, since the following condition is satisfied:

$$r_{41}=r_{42}=r_{343}=r_{44}=r$$

and the command value $\theta_c$ for the first angle and the command value $\phi_c$ for the second angle are sufficiently small, the command values for the first to fourth piezoelectric elements $4_1$, $4_2$, $4_3$, $4_4$ are given by the following equations:

$$x_{c1}=x_c-r\theta_c$$

$$x_{c2}=x_c-r\phi_c$$

$$x_{c3}=x_c+r\theta_c$$

$$x_{c4}=x_c+r\phi_c$$

After that, the first to fourth piezoelectric elements $4_1$, $4_2$, $4_3$, $4_4$ are driven by voltages applied by the piezoelectric-element driver on the basis of the corresponding command values $x_{c1}$, $x_{c2}$, $x_{c3}$, $x_{c4}$, to move the movable substrate $2_2$ and change the intersurface distance x between the pair of optical substrates $2$.

FIG. 6 are graphs that show a result of experimentation regarding response characteristics of etalon devices obtained when feedback control was carried out in variable spectroscopic elements, where the ordinate represents intersurface distance (nm) between pair of optical substrates, and abscissa represents time (sec). FIG. 6A is a result by a conventional variable spectroscopic element, and FIG. 6B shows a result by the variable spectroscopic element of this embodiment. In this experimentation, as shown by the broken lines, signals are inputted while switching the command value at every 0.02 seconds.

As is known from FIG. 6A-6B, in the variable spectroscopic element according to this embodiment, a time taken for the intersurface distance between the pair of optical substrates to converge is much shorter than that in the case of the conventional variable spectroscopic element. Therefore, even in a case where the optical property should be changed continuously and at high speed, the variable spectroscopic element of the present invention can achieve an accurate change of the optical property.

Next, an explanation will be made in detail on the feed forward control carried out at the control section of the variable spectroscopic element of this embodiment.

In the etalon device of the variable spectroscopic element of this embodiment, the movable substrate $2_2$ supported by the first to fourth piezoelectric elements $4_1$, $4_2$, $4_3$, $4_4$ makes a three-dimensional motion with the degree of freedom of 3, composed of a translational motion along the direction of the line that links the gravity centers of the optical substrates, a rotational motion with respect to the first angle $\theta$, and a rotational motion with respect to the second angle $\phi$.

For each of these motions, the etalon device has a unique characteristic given from its mass and material. Therefore, first, the characteristic of the etalon device regarding each motion will be explained.

To determine the transfer function $G_x$, which is a characteristic with respect to the translational motion of the etalon device, we first schematize the etalon device by denoting the mass of the displaceable portion of the variable spectroscopic element as m and regarding the first to fourth piezoelectric elements $4_1$, $4_2$, $4_3$, $4_4$ as springs with spring constants $k_1$, $k_2$, $k_3$, $k_4$ and dampers with damping constants $c_{x1}$, $c_{x2}$, $c_{x3}$, $c_{x4}$ coupled together, respectively, for the purpose of facilitating study of control.

The mass m is a value determined by the mass of the first to fourth piezoelectric elements $4_1$, $4_2$, $4_3$, $4_4$ and the mass of the movable substrate $2_2$, which are displaceable in reference to the outer frame $1$ of the etalon device. The spring constants $k_1$, $k_2$, $k_3$, $k_4$ are constants that can be obtained by a material analysis simulation based on the structure and material of the first to fourth piezoelectric elements $4_1$, $4_2$, $4_3$, $4_4$ and the movable substrate $2_2$. The damping constants $c_{x1}$, $c_{x2}$, $c_{x3}$, $c_{x4}$ are constants that can be determined from the mass m, the spring constants $k_1$, $k_2$, $k_3$, $k_4$, and a vibration status of the movable substrate $2_2$ and the first to fourth piezoelectric elements $4_1$, $4_2$, $4_3$, $4_4$ when signals are inputted.

On the basis of this model, an equation of motion is given as follows:

$$mx''=F_x=f_1+f_2+f_3+f_4$$

where x" is an acceleration regarding the translational motion when the gravity center of the mass m is at a distance x from the fixed end, $F_x$ is a magnitude of the force regarding the translational motion applied to the mass m when the gravity center of the mass m is at the distance x from the fixed end, and $f_1$, $f_2$, $f_3$, $f_4$ are magnitudes of forces generated by the first to fourth piezoelectric elements $4_1$, $4_2$, $4_3$, $4_4$, respectively.

Here, when the goal value of the intersurface distance between the pair of optical substrates 2 is denoted by u, the forces $f_1$, $f_2$, $f_3$, $f_4$ applied to the mass m are given by:

$$f_1 = k_1(u_1-x_1) - c_{x1}x_1'$$

$$f_2 = k_2(u_2-x_2) - c_{x2}x_2'$$

$$f_3 = k_3(u_3-x_3) - c_{x3}x_3'$$

$$f_4 = k_4(u_4-x_4) - c_{x4}x_4'$$

where $u_1$, $u_2$, $u_3$, $u_4$ are distances, in a direction along the translational motion, from the fixed end to the first to fourth piezoelectric elements $4_1$, $4_2$, $4_3$, $4_4$, respectively, when the intersurface distance between the pair of optical substrates 2 reaches the goal value u; $x_1$, $x_2$, $x_3$, $x_4$ are distances, in the direction along the translational motion, from the fixed end to instant positions of the first to fourth piezoelectric elements $4_1$, $4_2$, $4_3$, $4_4$, respectively, arranged on the movable substrate $2_2$; and $x_1'$, $x_2'$, $x_3'$, $x_4'$ are velocities regarding the translational motion at the positions of the piezoelectric elements $4_1$, $4_2$, $4_3$, $4_4$ arranged on the movable substrate $2_2$.

Since the etalon device of the variable spectroscopic element of this embodiment satisfies the following conditions:

$$k_1 = k_2 = k_3 = k_4 = k$$

$$c_{x1} = c_{x2} = c_{x3} = c_{x4} = c_x$$

therefore, the following equations are satisfied:

$$f_1 = k(u_1-x_1) - c_x x_1'$$

$$f_2 = k(u_2-x_2) - c_x x_2'$$

$$f_3 = k(u_3-x_3) - c_x x_3'$$

$$f_4 = k(u_4-x_4) - c_x x_4'$$

Furthermore, since x equals to the distance from the fixed end to the gravity center $G_2$ of the movable substrate $2_2$, the following equation is satisfied:

$$x = (x_1 + x_2 + x_3 + x_4)/4$$

and since x' equals to the velocity when the gravity center $G_2$ of the movable substrate $2_2$ is at the distance x from the fixed end, the following equation is satisfied:

$$x' = (x_1' + x_2' + x_3' + x_4')/4$$

These calculations above introduce the following equation:

$$mx'' = F_x = ku_1 + ku_2 + ku_3 + ku_4 - 4kx - 4c_x x'$$

Here, Laplace transform converts this equation, where $u = (u_1 + u_2 + u_3 + u_4)/4$ is given, into:

$$s^2 X = 4k/m \cdot U_{1-4} - 4k/m \cdot X - 4c_x/m \cdot sX$$

and accordingly the transfer function regarding the translational motion comes to be:

$$G_x = X/U_{1-4}$$
$$= (4k/m)/(s^2 + 4c_x/m \cdot s + 4k/m)$$
$$= A_x/(s^2 + B_x s + C_x)$$

It is noted that: "$A_x = 4k/m$" (where k is the spring constant of the actuators and m is the mass of the displaceable portion of the etalon device) is a parameter to express the sensitivity of input/output characteristic of the etalon device; "$B_x = 4c_x/m$" (where $c_x$ is a constant acquired from damping of vibration of the movable substrate when signals are inputted upon the spring constant being k and the mass being m) is a parameter to express damping characteristic, and a large value of this parameter means a favorable damping characteristic, in which vibration is stayed; and "$C_x = 4k/m$" is a parameter relating to the vibration frequency, and a large value of this parameter means that the vibration interval is short, to cause a high-speed rise to the peak.

In the similar manner, the transfer function $G_\theta$, which is a characteristic regarding the rotational motion with respect to the first angle $\theta$ and the transfer function $G_\phi$, which is a characteristic regarding the rotational motion with respect to the second angle $\phi$, of the etalon device, are given as follows:

$$G_\theta = \Theta/U_{1,3}$$
$$= (rk/J)/(s^2 + 2c_\theta/J \cdot s + 2r^2 k/J)$$
$$= A_\theta/(s^2 + B_\theta s + C_\theta)$$

$$G_\phi = \Phi/U_{2,4}$$
$$= (rk/J)/(s^2 + 2c_\phi/J \cdot s + 2r^2 k/J)$$
$$= A_\phi/(s^2 + B_\phi s + C_\phi)$$

where J is a moment of inertia, which is determined by the mass of the first to fourth piezoelectric elements $4_1$, $4_2$, $4_3$, $4_4$ and the mass of the movable substrate $2_2$, which are displaceable in reference to the outer frame 1 of the etalon device; the damping constants $c_\theta$, $c_\phi$ are constants that can be determined from the moment of inertia J, the spring constants $k_1$, $k_2$, $k_3$, $k_4$, and the vibration status of the movable substrate $2_2$ when signals are inputted; $A_\theta$, $A_\phi$ are parameters that represent the sensitivity of input/output characteristic of the etalon device; $B_\theta$, $B_\phi$ are parameters that represent the damping characteristic; and $C_\theta$, $C_\phi$ are parameters that relate to the vibration frequency.

Therefore, if feed forward control is not implemented, an output value y in response to an input value p, that is, the behaviour of the etalon device is expressed as a result of multiplication by the transfer functions $G_x$, $G_\theta$, $G_\phi$ (hereafter generally referred to as "transfer function G"), as shown below:

$$y = G \cdot p$$

which means that the command value disagrees with the actual action.

Therefore, in the variable spectroscopic element of this embodiment, a feed forward control is carried out as expressed below so that the behavior of the etalon device agrees with an input value:

$$y = 1/G \cdot G \cdot p$$

Here, the multiplier 1/G for the multiplicand p is expressed as follows:

$$1/G=(s^2+Bs+C)/A$$

Therefore, when the input value is p and feed forward control is carried out, the output value y is expressed by the following function:

$$y(t)=(d^2p/dt^2+B\cdot dp/dt+C\cdot p)/A$$

In the variable spectroscopic element of this embodiment, for each of the translational motion in the direction along the line that links the gravity centers of the pair of optical substrates, the rotational motion with respect to the first angle θ, and the rotational motion with respect to the second angle φ, the feedback control and the feed forward control are carried out individually, and output values from a FB controller and a FF controller are added up as shown in FIG. 4, to be inputted, as values of x, θ, φ, into the command-value converting section $5_5$ shown in FIG. 5. The command-value converting section $5_5$ converts the command values $x_c$, $θ_c$, $φ_c$, into command values $x_{c1}$, $x_{c2}$, $x_{c3}$, $x_{c4}$ for the respective first to fourth piezoelectric elements $4_1$, $4_2$, $4_3$, $4_4$.

FIG. 7 are graphs that show a result of experimentation regarding response characteristics of the etalon device of a variable spectroscopic element, where the ordinate represents intersurface distance (nm) between a pair of optical substrates, and abscissa represents time (sec). FIG. 7A is a result of the case where only feedback control is implemented, and FIG. 7B is a result of the case where feedback control and feed forward control are implemented. The broken lines represent input signals.

As is known from FIG. 7, in the case where control is implemented upon feedback control and feed forward control being combined together, the overshoot can be stayed very small, in comparison with the case where control is implemented only by the feedback control. Furthermore, a time taken for the intersurface distance between the pair of optical substrates to converge, to be specific, a time taken for the intersurface distance to come to be stable around ±3 nm of the goal value is very short. In addition, the response speed to the input signal is fast. Therefore, the variable spectroscopic element of the present invention can change its optical property accurately even in the case where the optical property should be changed continuously and at high speed.

In this embodiment, the feedback control and the feed forward control are carried out for each of the intersurface distance x between the pair of optical substrates 2, the first angle θ, and the second angle φ. However, all of these are not necessarily needed. The feedback control and the feed forward control may be carried out for only one of these parameters.

Next, in reference to FIG. 8 to FIG. 11, an explanation will be made on modification examples of the etalon device of the variable spectroscopic element of this embodiment.

Not like the etalon device of the variable spectroscopic element of the embodiment described above, in an etalon device shown in FIG. 8, the respective combinations of the first capacitive sensor $3_1$ and the first piezoelectric element $4_1$, the second capacitive sensor $3_2$ and the second piezoelectric element $4_2$, the third capacitive sensor $3_3$ and the third piezoelectric element $4_3$, and the fourth capacitive sensor $3_4$ and the fourth piezoelectric element $4_4$ are not arranged at regular intervals as viewed from the direction along the line that links the respective gravity centers of the mutually facing surfaces of the pair of optical substrates 2.

However, in such an arrangement also, if the combination of the first capacitive sensor $3_1$ and the first piezoelectric element $4_1$ and the combination of the third capacitive sensor $3_3$ and the third piezoelectric element $4_3$ are arranged, as viewed from the direction along the line that links the respective gravity centers of the mutually facing surfaces of the pair of optical substrates 2, at positions that form symmetry with respect to an axis determined by the line that links the respective gravity centers and so are the combination of the second capacitive sensor $3_2$ and the second piezoelectric element $4_2$ and the combination of the fourth capacitive sensor $3_4$ and the fourth piezoelectric element $4_4$, control can be carried out at the control section by arithmetic operations similar to those in the etalon device of the variable spectroscopic element of the embodiment described above.

Not like the etalon device of the variable spectroscopic element of the embodiment described above, in each of etalon devices shown in FIG. 9 and FIG. 10, the first capacitive sensor $3_1$, the second capacitive sensor $3_2$, the third capacitive sensor $3_3$, and the fourth capacitive sensor $3_4$ are arranged, as viewed from the direction along the line that links the respective gravity centers of the mutually facing surfaces of the pair of optical substrates 2, at positions not overlapping with the first piezoelectric element $4_1$, the second piezoelectric element $4_2$, the third piezoelectric element $4_3$, and the fourth piezoelectric element $4_4$, respectively.

However, in such an arrangement also, if the first to fourth piezoelectric elements $4_1$, $4_2$, $4_3$, $4_4$ are arranged, respectively, as viewed from the direction along the line that links the respective gravity centers of the mutually facing surfaces of the pair of optical substrates 2, on lines that extend from the gravity centers toward respective centers of the first to fourth capacitive sensors $3_1$, $3_2$, $3_3$, $3_4$, control can be carried out at the control section by arithmetic operations similar to those in the etalon device of the variable spectroscopic element of the embodiment described above.

Not like the etalon device of the variable spectroscopic element of the embodiment described above, an etalon device shown in FIG. 11 is not provided with an outer frame 1, and the first piezoelectric element $4_1$, the second piezoelectric element $4_2$, the third piezoelectric element $4_3$, and the fourth piezoelectric element $4_4$ are fixed on the facing surface of the fixed substrate $2_1$ so as not to intercept light passing through the etalon device.

However, in such an arrangement also, control can be carried out at the control section by arithmetic operations similar to those in the etalon device of the variable spectroscopic element of the embodiment described above.

Embodiment 2

In reference to FIG. 12 and FIG. 13, an explanation will be made on the second embodiment of the variable spectroscopic element provided with an etalon device, which is a variable spectroscopic element according to the present invention. Since members constituting the etalon device of the variable spectroscopic element of this embodiment are same as those constituting the etalon device of Embodiment 1, same reference symbols are tagged to same members and their detailed explanations are omitted. Since the configuration of the control section and arithmetic operations performed there are substantially the same as the arithmetic operations performed in the control section of the variable spectroscopic element of Embodiment 1, a detailed explanation on these are omitted.

Figure 12:
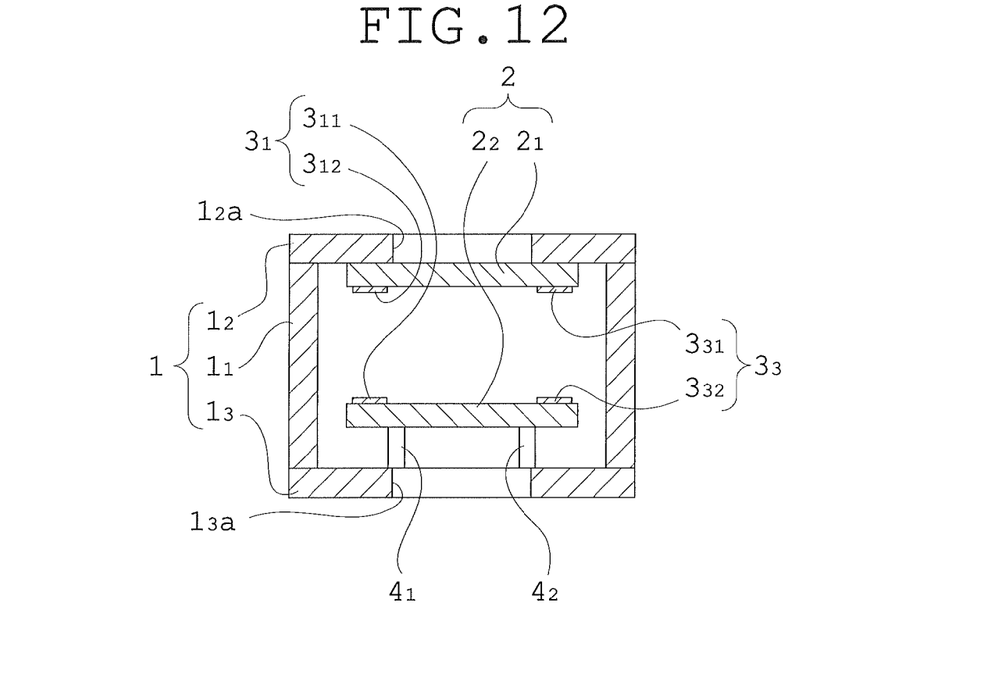
FIG. 12 is a sectional view that shows an etalon device of a variable spectroscopic element according to Embodiment 2.
Figure 13:
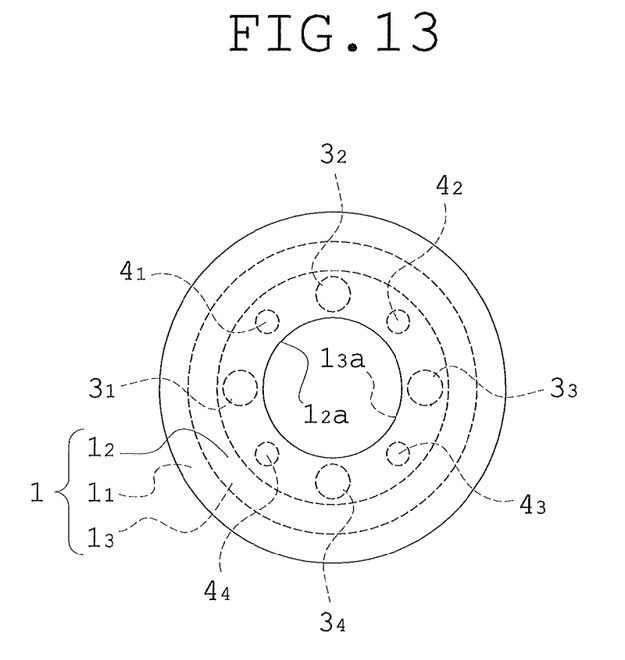
FIG. 13 is a plan view of the etalon device of FIG. 12.

FIG. 12 is a sectional view that shows the etalon device of the variable spectroscopic element according to this embodiment. FIG. 13 is a plan view of the etalon device of FIG. 12.

In reference to FIG. 12 and FIG. 13, an explanation will be made on the configuration of the etalon device of this variable spectroscopic element.

In the etalon device of the variable spectroscopic element of this embodiment, the first to fourth piezoelectric elements $4_1$, $4_2$, $4_3$, $4_4$ and the first to fourth capacitive sensors $3_1$, $3_2$, $3_3$, $3_4$ are alternately arranged at regular intervals around a circle.

Next, an explanation will be made on the action of the movable substrate $2_2$ in the etalon device of the variable spectroscopic element according to this embodiment.

In the variable spectroscopic element of Embodiment 1, the distance between the respective gravity centers of the mutually facing surfaces of the pair of optical substrates 2 is calculated out from output values of the first to fourth capacitive sensors $3_1$, $3_2$, $3_3$, $3_4$; the first angle θ is calculated out from output values of the first and third capacitive sensors $3_1$, $3_3$; the second angle φ is calculated out from output values of the second and fourth capacitive sensors $3_2$, $3_4$; activity of the first and third piezoelectric elements $4_1$, $4_3$ is controlled on the basis of the distance x between the gravity centers and the first angle θ; and activity of the second and fourth piezoelectric elements $4_2$, $4_4$ is controlled on the basis of the distance x between the gravity centers and the second angle φ.

On the other hand, in the variable spectroscopic element of this embodiment, the distance x between the gravity centers, the first angle θ and the second angle φ are calculated out from all output values of the first to fourth capacitive sensors $3_1$, $3_2$, $3_3$, $3_4$, and activity of the first to fourth piezoelectric elements $4_1$, $4_2$, $4_3$, $4_4$ is controlled on the basis of the distance x between the gravity centers, the first angle θ and the second angle φ.

As described above, in this embodiment, the capacitive sensors 3 and their respective mating piezoelectric elements 4 are not arranged at positions overlapping each other as viewed from the direction along the line that links the gravity centers of the facing surfaces of the pair of optical substrates 2. However, since the intersurface distance between the pair of optical substrates detected by the capacitive sensors 3 is converted into intersurface distances $x_1$, $x_2$, $x_3$, $x_4$ at the positions of the first to fourth piezoelectric elements $4_1$, $4_2$, $4_3$, $4_4$, the same control as Embodiment 1 can be achieved.

Therefore, in Embodiment 2 also, similar to the variable spectroscopic element of Embodiment 1, a time taken for the intersurface distance between the pair of optical substrates to converge is much shorter than that in the case of the conventional variable spectroscopic element. Therefore, even in a case where the optical property should be changed continuously and at high speed, the variable spectroscopic element of the present invention can achieve an accurate change of the optical property.

Since the present invention can provide a variable spectroscopic element that can change its optical property accurately and at high speed, it can be preferably applied to a spectral imaging endoscope apparatus and the like, and thus is very practical.

What is claimed is:

1. A variable spectroscopic element comprising:
   a pair of optical substrates arranged to face each other with a space between;
   first to fourth capacitive sensors each of which has a pair of electrodes arranged on mutually facing surfaces of the pair of optical substrates for detecting an intersurface distance between the mutually facing surfaces of the pair of optical substrates at each position where the pair of electrodes are arranged; and
   first to fourth actuators each of which moves at least one of the pair of optical substrates relative to the other optical substrate for changing the intersurface distance between the mutually facing surfaces of the pair of optical substrates;
   wherein the first capacitive sensor and the third capacitive sensor are arranged at positions that form symmetry with respect to an axis determined by a line that links respective gravity centers of the mutually facing surfaces of the pair of optical substrates;
   wherein the second capacitive sensor and the fourth capacitive sensor are arranged at positions that form symmetry with respect to the axis determined by the line that links the respective gravity centers of the mutually facing surfaces of the pair of optical substrates;
   wherein the first to fourth actuators are arranged, respectively, on lines that extend from the gravity centers of the mutually facing surfaces of the pair of optical substrates toward respective centers of the first to fourth capacitive sensors; and
   wherein the variable spectroscopic element is provided with a control section that calculates, from signals by the first to fourth capacitive sensors, a distance between the respective gravity centers of the mutually facing surfaces of the pair of optical substrates, calculates, from a signal by the first capacitive sensor and a signal by the third capacitive sensor, a first angle formed by a plane perpendicular to the line that links the respective gravity centers and one of the mutually facing surfaces of moving one of the optical substrates, calculates, from a signal by the second capacitive sensor and a signal by the fourth capacitive sensor, a second angle formed by a plane perpendicular to the line that links the respective gravity centers and the one of the mutually facing surface of the moving one of the optical substrates, drives the first actuator and the third actuator on a basis of the distance between the gravity centers and the first angle, drives the second actuator and the fourth actuator on a basis of the distance between the gravity centers and the second angle, carries out a feedback control with respect to the distance between the gravity centers, the first angle and the second angle, and carries out a feed forward control with respect to at least one of the distance between the gravity centers, the first angle and the second angle.

2. The variable spectroscopic element according to claim 1, wherein the feedback control is PID control, and
   wherein the feed forward control is such that a sum of: a derivative by second-order differentiation of an input value; a quotient, as divided by a mass of a displaceable portion of the variable spectroscopic element, of a product, as multiplied by a damping constant of the first to fourth actuators, of a derivative by differentiation of the input value; and a quotient, as divided by the mass of the displaceable portion of the variable spectroscopic element, of a product, as multiplied by a spring constant of the first to fourth actuators, of the input value; is divided by a quotient, as divided by the mass of the displaceable portion of the variable spectroscopic element, of the spring constant of the first to fourth actuators, to yield a resulted value as an output value.

3. The variable spectroscopic element according to claim 2, wherein the feed forward control is such that the following output value is outputted in response to the input value p:

$$y(t)=(d^2p/dt^2+B \cdot dp/dt+C \cdot p)/A$$

where $A=4k/m$, k is the spring constant of the first to fourth actuators, m is the mass of the displaceable portion of the variable spectroscopic element, $B=4c/m$, c is a constant acquired from damping of vibration of the displaceable portion of the variable spectroscopic element when signals are inputted with the spring constant of the actuators being k and the mass of the displaceable portion of the variable spectroscopic element being m, and $C=4k/m$.

4. A variable spectroscopic element comprising:
- a pair of optical substrates arranged to face each other with a space between;
- first to fourth capacitive sensors each of which has a pair of electrodes arranged on mutually facing surfaces of the pair of optical substrates for detecting an intersurface distance between the mutually facing surfaces of the pair of optical substrates at each position where the pair of electrodes are arranged; and
- first to fourth actuators each of which moves at least one of the pair of optical substrates relative to the other optical substrate for changing the intersurface distance between the mutually facing surfaces of the pair of optical substrates;
- wherein the first capacitive sensor and the third capacitive sensor are arranged at positions that form symmetry with respect to an axis determined by a line that links respective gravity centers of the mutually facing surfaces of the pair of optical substrates;
- wherein the second capacitive sensor and the fourth capacitive sensor are arranged at positions that form symmetry with respect to the axis determined by the line that links the respective gravity centers of the mutually facing surfaces of the pair of optical substrates;
- wherein the first to fourth capacitive sensors and the first to fourth actuators are alternately arranged at equiangular intervals with respect to the axis determined by the line that links the respective gravity centers of the mutually facing surfaces of the pair of optical substrates, as viewed from a direction along the axis; and
- wherein the variable spectroscopic element is provided with a control section that calculates, from signals by the first to fourth capacitive sensors, a distance between the respective gravity centers of the mutually facing surfaces of the pair of optical substrates, calculates, using values of intersurface distances between the mutually facing surfaces of the pair of optical substrates at positions where the first and third actuators are arranged, which are acquired from signals by the first to fourth capacitive sensors, a first angle formed by a plane perpendicular to the line that links the respective gravity centers and one of the mutually facing surfaces of moving one of the optical substrates, calculates, using values of interface distances between the mutually facing surfaces of the pair of optical substrates at positions where the second and fourth actuators are arranged, which are acquired from signals by the first to fourth capacitive sensors, a second angle formed by a plane perpendicular to the line that links the respective gravity centers and the one of the mutually facing surface of the moving one of the optical substrates, drives the first to fourth actuators on a basis of the distance between the gravity centers, the first angle and the second angle, carries out a feedback control with respect to the distance between the gravity centers, the first angle and the second angle, and carries out a feed forward control with respect to at least one of the distance between the gravity centers, the first angle and the second angle.

* * * * *